United States Patent [19]

Urano

[11] Patent Number: 5,155,342
[45] Date of Patent: Oct. 13, 1992

[54] PREPAID CARD PROCESSING DEVICE

[75] Inventor: Takayoshi Urano, Nagoya, Japan

[73] Assignee: Brother Kogyo Kabushiki Kaisha, Nagoya, Japan

[21] Appl. No.: 524,729

[22] Filed: May 17, 1990

[30] Foreign Application Priority Data

Jul. 13, 1989 [JP] Japan .................. 1-181500

[51] Int. Cl.$^5$ .......................... G06F 15/30
[52] U.S. Cl. ................................. 235/380
[58] Field of Search ............... 235/380, 381, 379

[56] References Cited

U.S. PATENT DOCUMENTS

| | | | |
|---|---|---|---|
| 4,114,027 | 9/1978 | Slater et al. ............ | 235/379 |
| 4,544,834 | 10/1985 | Newport et al. ........ | 235/380 |
| 4,589,785 | 5/1986 | Sato ......................... | 400/61 |
| 4,877,947 | 10/1989 | Mori . | |
| 4,900,904 | 2/1990 | Wright et al. .......... | 235/381 |
| 4,907,257 | 3/1990 | Asano et al. ........... | 235/380 |
| 4,992,646 | 2/1991 | Collin ...................... | 235/380 |

FOREIGN PATENT DOCUMENTS

0262695 3/1990 Japan .

*Primary Examiner*—John W. Shepperd
*Assistant Examiner*—Mike Kessell
*Attorney, Agent, or Firm*—Oliff & Berridge

[57] ABSTRACT

A prepaid card processing device for processing a prepaid card has a memory for storing information relating to an account, e.g., of money, and a printing portion on which the information is recorded. A prepaid card processing device has a reading portion for reading the information stored in the card memory; an input portion for inputting a charge amount of money for a transaction; a defrayal information processing portion for calculating the balance amount based on the charge amount inputted by the input portion and for preparing the defrayal information relating to the balance amount and the charge amount; a printing portion for printing defrayal information on the card; and a decision control portion for deciding whether or not the defrayal information is to be printed on the card by the printing portion. When the decision control portion decides that printing need not be performed, no printing on the card occurs. Thereby, the printing space on the card can be effectively utilized.

23 Claims, 7 Drawing Sheets

FIG.6

| DECISION DATA ADDRESS | | DECISION VALUE (yen) |
|---|---|---|
| 15 | Q15 | 9000 |
| 14 | Q14 | 8000 |
| 13 | Q13 | 7000 |
| 12 | Q12 | 6000 |
| 11 | Q11 | 5000 |
| ⋮ | ⋮ | ⋮ |
| X | Qx | |
| ⋮ | ⋮ | ⋮ |
| 5 | Q5 | 600 |
| 4 | Q4 | 400 |
| 3 | Q3 | 200 |
| 2 | Q2 | 100 |
| 1 | Q1 | 0 |

11

PREPAID CARD PROCESSING DEVICE

BACKGROUND OF THE INVENTION

1. Field of the Invention

The present invention relates to a prepaid card processing device, and more particularly to a printing control device installed in a prepaid card processing device.

2. Description of the Related Art

In recent years, prepaid cards are frequently used in place of money in retail stores in general, and therefore a prepaid processing device for processing prepaid cards is installed in retail stores.

Such a prepaid card processing device is provided with a reading/writing portion for reading or writing information relating to money stored in an account, a control portion for changing the read information on payment by a customer, a card printing portion for printing the balance amount of the card onto a record surface of the prepaid card (often called recording portion), and a printing control portion for controlling printing on the card printing portion.

The prepaid card is provided with a record surface for recording the use history of the card, and every time the card is used printing is performed on the record surface. Thereby, the owner of the card can confirm the balance amount of the card.

However, in the case that the payment amount per one time using the card is small and the payment account is frequently repeated, a problem occurs in that before the balance amount of the card is completely used, the record surface to be printed for recording the use history of the card is printed up so that no space remains for recording a new use history and the owner of the card cannot confirm the balance amount of the card.

SUMMARY OF THE INVENTION

In order to solve the above-mentioned problems in the prior art, an object of the invention is to provide a prepaid card control device capable of recording on the card, wherein every time the balance amount attains a suitable amount the use history can be recorded on the record surface of the card, so that the owner of the card can confirm suitably the balance amount of the card before the balance amount is used up.

In order to attain the above object, the present invention provides, in one aspect, a card processing device for processing a card having a recording portion on which information is recorded, comprising: input means for inputting a charge amount to be charged against an account for a transaction; defrayal information preparing means for calculating a balance amount based on the charge amount inputted by the input means and a previous balance amount, and for preparing defrayal information relating to the balance amount or charge amount; recording means for recording the defrayal information on the card; and decision control means for controlling whether or not a recording of the defrayal information is performed on the card by the recording means for a given transaction.

BRIEF DESCRIPTION OF THE DRAWINGS

The above and other objects, features and advantages of the present invention will become more apparent from the following description of the preferred embodiments and the accompanying drawings, in which:

FIG. 6 is an explaining diagram illustrating a decision data region in a control unit.

DETAILED DESCRIPTION OF THE PREFERRED EMBODIMENTS

Figure 2:
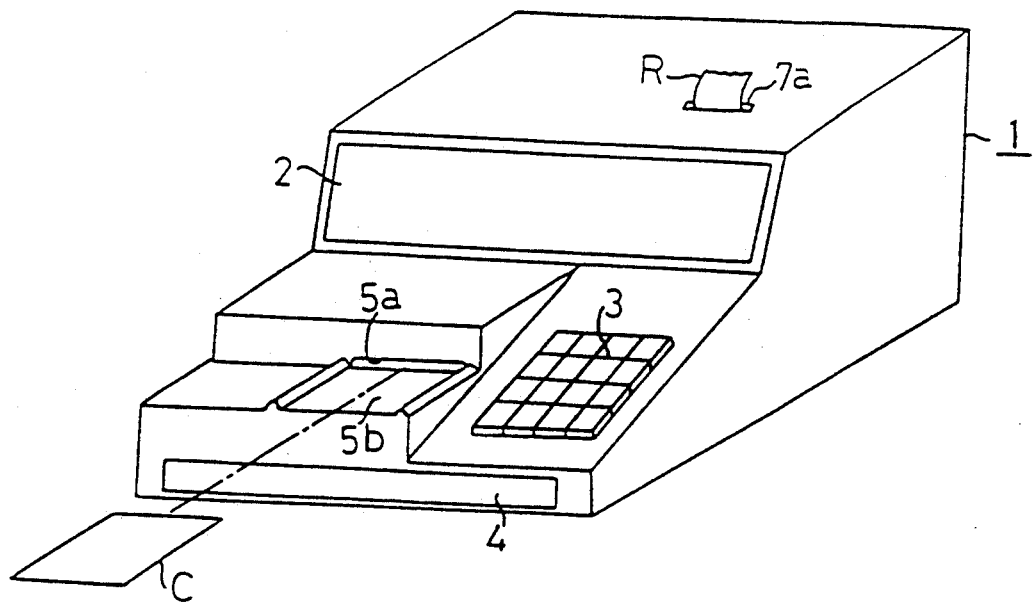
FIG. 2 is a perspective view illustrating a prepaid card processing device as a whole.

As shown in FIG. 2, a prepaid card processing device 1 functions as a cash register, and a display unit 2 for displaying proceeds or the like is installed at an upper side of the front part of the device 1. An input device 3 where various sorts of input keys including 10 numerical keys for inputting proceeds is installed at the right lower side of the front part of the device 1. A storage position 4 of a cash storage box for storing cash is installed at the lower side of the device 1.

A card inlet/outlet port 5a for inserting a card C to the inside of the device 1 is installed at the left side of the input device 3 on the front part of the device 1, and a card inlet/outlet base 5b for holding the card C is installed in front of the card inlet/outlet port 5a. A card feeder 5 coupled with the card inlet/outlet port 5a is installed in the inside of the device 1.

Figure 3:
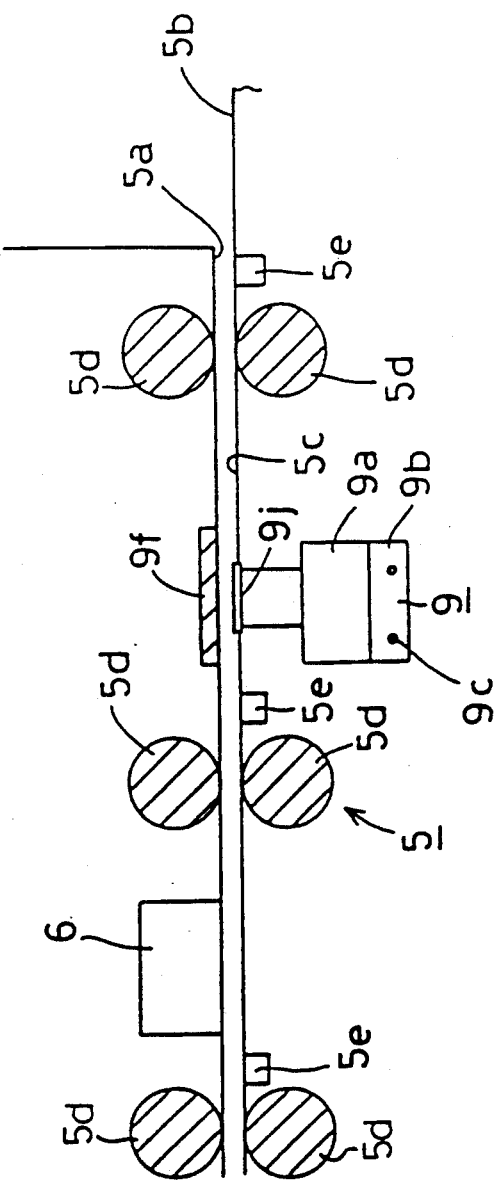
FIG. 3 is an enlarged fragmentary sectional view illustrating an outline of a printing mechanism and surroundings of a card feeder for a card transfer.

As shown in FIG. 3, the card feeder 5 is provided with a conveying path 5c through which the card C passes, three pairs of feed rollers 5d arranged along the conveying path 5c for conveying the card C along the conveying path 5c, and a plurality of sensors 5e arranged along the conveying path 5c for detecting the card C on the conveying path 5c.

When the prepaid card C is placed on the card inlet/outlet base 5b and is inserted to the card inlet/outlet port 5a by a clerk of a retail store, the device 1 detects the card C by the sensors 5e. Thereby, the feed rollers 5d are rotated and the card C is conveyed along the conveying path 5c to the inside of the device 1.

A printing device 9 for printing information regarding the amount of money or the like onto the recording portion of the prepaid card C is installed between the feed roller pair 5d in the vicinity of the card inlet/outlet port 5a arranged along the conveying path 5c and another feed roller pair 5d at the rear side of the former feed roller 5d.

An information reading/writing device 6 for reading or writing information regarding the amount of money or the like onto the magnetic storage tape embedded in the prepaid card C which is usually used in a cash card or the like is installed between the feed roller pair 5d at the rear side along the conveying path 5c and the feed roller pair 5d at the furthermost rear side.

The reading/writing device 6 reads information of the magnetic storage tape of the prepaid card C and transmits it to a control unit 8 as hereinafter described, and also stores information from the control unit 8.

An outlet port 7a of a sheet R on which recording information of the amount of money or the like is recorded is installed at a rear side of the device 1. A paper feeder (not shown) coupled with the outlet port 7a and a sheet printing device which are usually used in a register, are installed in the device 1.

The paper feeder discharges the sheet R after recording by the printing device 7. Since the paper feeder and the sheet printing device 7 are well known in cash registers and the like, a detailed description is omitted.

The printing device 9 comprises printing head 9a for printing on the card C, a carriage 9b for holding the printing head 9a to move in the direction perpendicular to both of the conveying path 5c and the lengthwise direction of the sheet, a wire 9c connected to the carriage 9b for moving the carriage 9b in the same direction of movement of printing head 9a, a drive mechanism well known in printers and the like for moving the wire 9c connected to the carriage 9b in the same direction of movement of printing head 9a, a platen 9f installed in front of the printing head 9a for holding the card C, and an ink ribbon 9j hung between the printing head 9a and the platen 9f.

The platen 9f is disposed at an upper side of the conveying path 5c, and has a length more than the range of the reciprocating motion of the printing head 9a in the above-mentioned direction. The printing head 9a, the carriage 9b and the like are disposed at a lower side of the conveying path 5c. The drive mechanism moves the wire 9c, and further moves the printing head 9a and the carriage 9b in such an above-mentioned manner.

The printing head 9a is controlled by the control unit 8, and performs printing of information (which will be described later) at a prescribed position on the card C, disposed at the conveying path 5c, through the ink ribbon 9j. The printing head 9a is a head of wire dot type, and is normally used in printers and the like.

The ink ribbon 9j is wound on a pair of pulleys (not shown) and hung, and after the printing head 9a performs printing of a prescribed amount, the ink ribbon 9j is fed in the same direction of the movement of printing head 9a by a ribbon feeding motor (not shown) or the like as commonly used in printers and the like.

The control unit 8 controls the card feeder 5 to convey the card C to the prescribed position along the conveying path 5c, and while the carriage 9b is moved, the control unit 8 drives the printing device 9 and the printing head 9a performs printing on the card C.

When the printing head 9a prints a next line of the card C, the control unit 8 controls the ribbon feeding motor so as to feed the ink ribbon 9j by a prescribed amount, and it also controls the card feeder 5 so that the card C is conveyed by a prescribed amount corresponding to one line and is stopped. It also controls the printing device 9 so that the printing is performed by the printing head 9a through the ink ribbon 9j.

Figure 1:
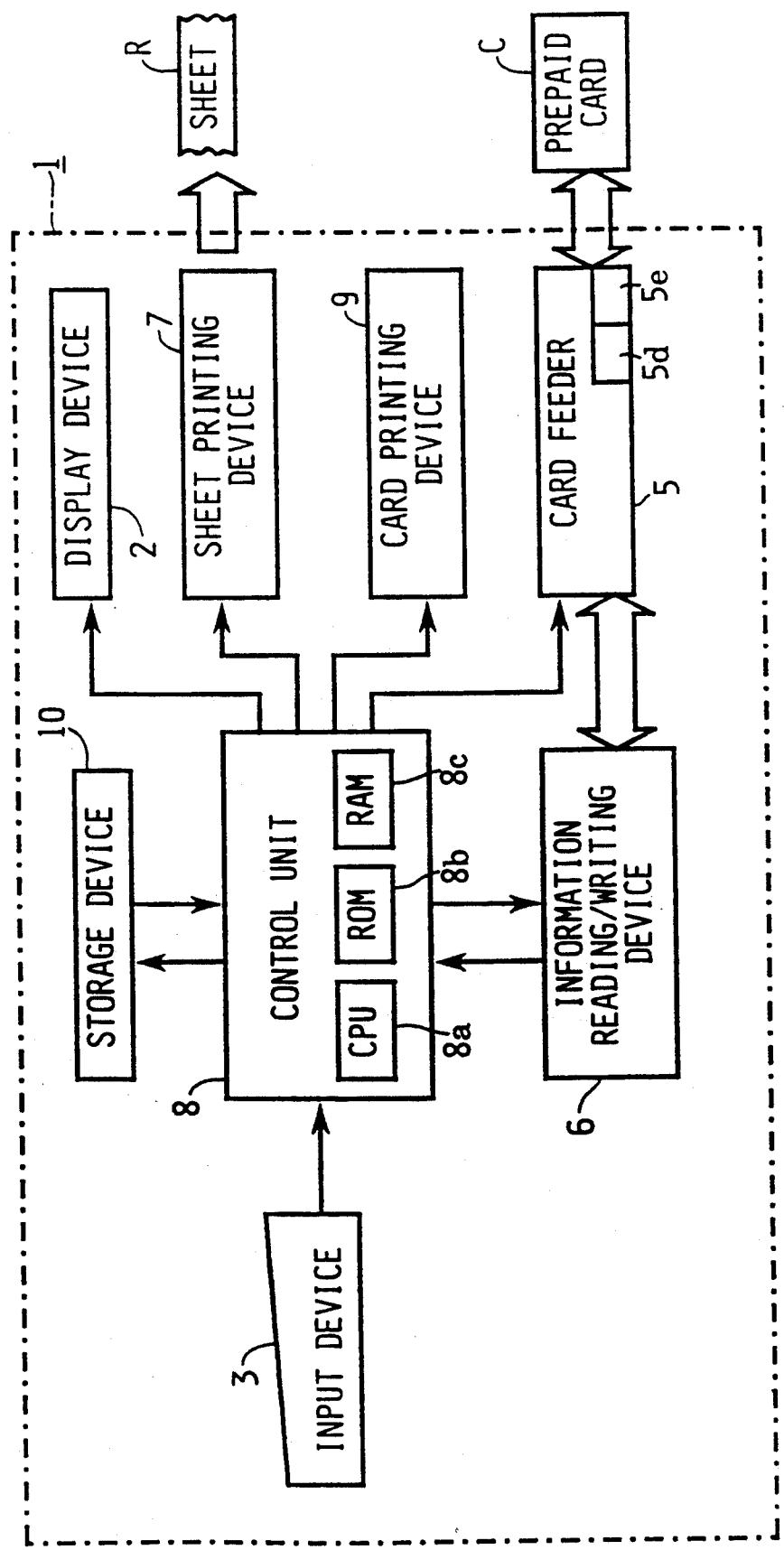
FIG. 1 is a block diagram illustrating an electric constitution of a prepaid card processing device.

The prepaid card processing device is controlled by the control unit 8 as shown in FIG. 1, and the control unit 8 is provided with a central processing unit (CPU) 8a, a read only memory (ROM) 8b and a random access memory (RAM) 8c. The RAM 8c acts as a work area for performing various sorts of processing and stores data, and the ROM 8b stores various sorts of processing programs relating to proceeds or the like and programs to control various sorts of devices included in the device 1. The CPU 8a acts in accordance with the programs stored in the ROM 8b and data stored in the RAM 8c.

The display device 2, the card feeder 5, the sheet printing device 7, the sensors 5e and the printing device 9 are electrically connected to the output port of the control unit 8 in the card processing device 1, and the input device 3 is electrically connected to the input port of the control unit 8. The information reading/writing device 6 and a storage device 10 as hereinafter described are electrically connected to the control unit 8, and information is inputted and outputted mutually between these devices 6, 10 and the control unit 8.

The storage device 10 as information storage means constituted by a magnetic disk device is installed within the card control device 1. The storage device 10 stores information about the registration number of the prepaid card C and the balance amount, data used by the control unit 8 during performing various sorts of operations, and a plurality (e.g., 15 pieces as shown in FIG. 6) of decision data $Q_1$-$Q_{15}$ which are reference balance amounts to be used in the decision whether or not the printing of the defrayal information as hereinafter described is performed on the card C.

Next, operation of the prepaid card processing device will be described.

In this case, the information recorded in the magnetic storage tape recording portion of the prepaid card C used in the embodiment is registration number data, as well as the maximum line number data Y capable of being printed on the recording portion of the card C, the already printed line number data (y) indicating the number of lines already printed on the recording portion of the card C, and the decision upper limit address Z indicating the upper limit of the address of the decision data $Q_1$-$Q_{15}$ to be used in the printing decision.

An example is now described. The maximum line number Y capable of being printed on the card C is 15 lines and one line is used in each printing. The card C is initially in a non-used state, and the contract amount, for example, ten thousand yen is the balance amount A. The already printed line number (y) is set to y=0 (no printing has occurred) and the decision upper limit address Z is set to Z=15.

When the power source of the card control device 1 is turned on, the control unit 8 accesses the storage device 10, and as shown in FIG. 6, the decision data $Q_1$-$Q_{15}$ to be used in the print decision are transferred from the storage device 10 to the decision data region 11 of the RAM 8c (The addresses of the region shall be made 1-15.). In this case, the decision data $Q_1$-$Q_{15}$ are entered in sequence from the smallest value to the lower address side of the decision data region 11, and the operation of preparing the control unit 8 is completed.

Figure 4:
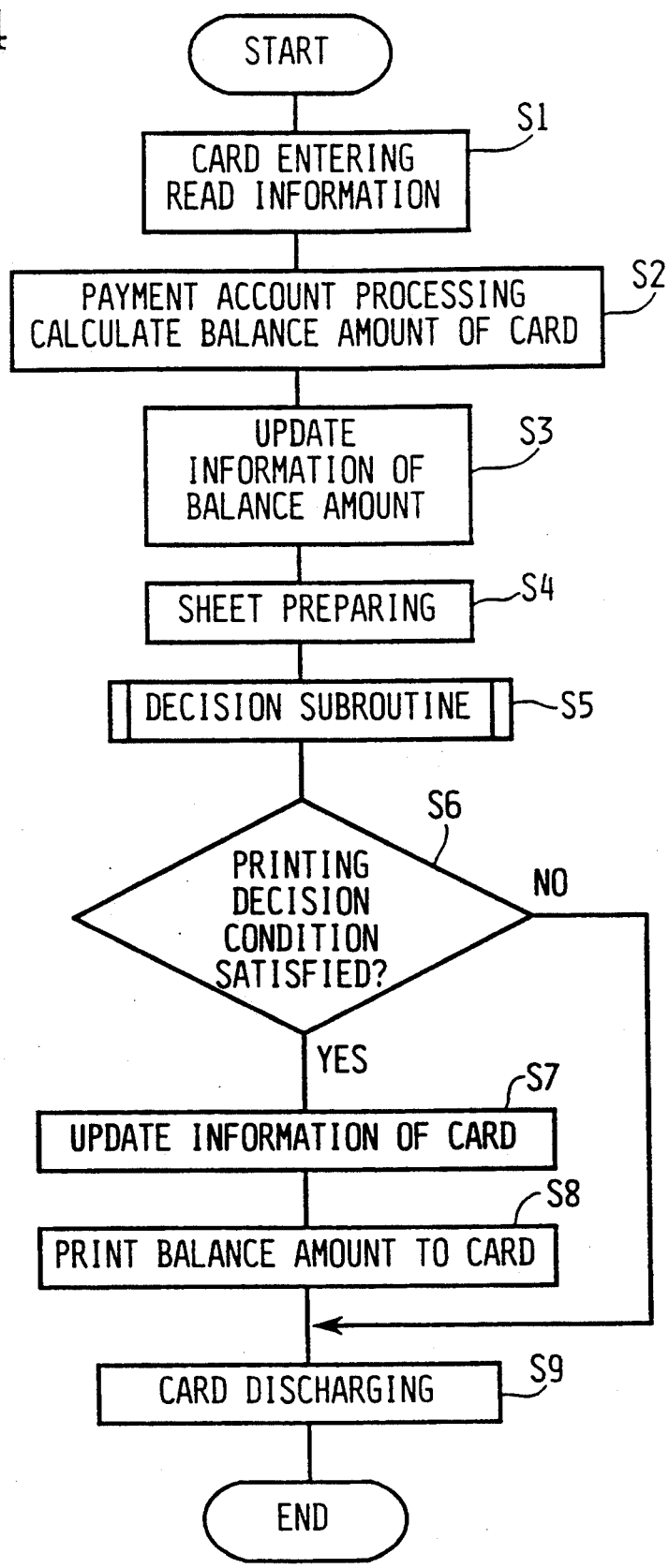
FIG. 4 is a flow chart illustrating a processing procedure.

The payment accounting is performed in accordance with a flow chart shown in FIG. 4. The prepaid card C possessed by the customer is placed onto the card inlet/outlet base 5b by the clerk operating the card processing device 1, and is pushed from the card inlet/outlet port 5a along the inlet/outlet base 5b into the card feeder 5. When the sensor 5e detects that the prepaid card C is pushed into the card feeder 5, the control unit 8 rotates the feed roller 5d and the card C is taken further to the inside and moved to the information reading/writing device 6.

The information reading/writing device 6 reads the registration number of the card C as well as the maximum line number data Y, the already printed line number data (y) and the decision upper limit address Z from the magnetic storage tape of the card C, and outputs the information to the control unit 8 in step 1 (hereinafter indicated simply by S1, and following steps are indicated in a like manner).

The control unit 8 accesses the storage device 10 based on the registration number of the card C, and reads the balance amount A of the card C corresponding to the registration number. When the input key of the input device 3 is operated by the clerk and the retail price of the article bought by the customer is inputted, the control unit 8 adds the inputted retail price every time and calculates the total payment amount, and subtracts the total payment amount from the balance amount A of the card C already read and calculates a new balance amount B (S2). Assume that the new balance amount B is 8500 yen.

Next, the control unit 8 again accesses the storage device 10, and updates the balance amount A of the customer corresponding to the registration number of the card C into the balance amount B newly calculated (S3). Subsequently the control unit 8 drives the sheet printing device 7. Thereby, the retail price of each article bought by the customer and the total amount are printed to the paper, and the sheet R is prepared and discharged from the sheet outlet port 7a (S4).

After the sheet R is prepared, in order to decide whether or not the printing of the defrayal information is performed on the prepaid card C, the control unit 8 performs operation processing based on the series of the decision data $Q_x$ and the balance amount B in the decision sub-routine (S5). If a definite condition (to be described) is satisfied, the decision flag F as internal data is set at F=0, and if the definite condition is not satisfied, the decision flag F is set at F=1. The operation processing of the control unit 8 in the decision sub-routine will be described later. The control unit 8 decides the numerical value of the decision flag F in S6. In the case of F=0, the balance amount B is deemed to satisfy the printing condition and the program is advanced to S7. On the other hand, in the case of F=0, the program jumps S7, S8 and is advanced to S9, and the card C remaining in the original state is discharged from the inside of the device 1.

In S7, the control unit 8 performs subtraction of the already printed line number (y) into (y−1), and this (y−1) is made the new already printed line number (y). The new already printed line number (y) and the upper limit address Z set again in the decision sub-routine (S5) are written in the card C by the information reading/writing device 6, and data relating to the already printed line number (y) and the upper limit address Z on the card C are updated.

Subsequently, the control unit 8 drives the card feeder device 5 so as to move the card C from the information reading/writing device 6 in the direction of the card inlet/outlet port 5a. The control unit 8 calculates the printing timing at the midway of moving based on the maximum line number Y and the already printed line number (y) before the subtraction, and the card printing device 9 prints the balance amount B on the next line after the already printed line of the recording portion of the card C (S8). The card C is discharged from the card inlet/outlet port 5a onto the card inlet/outlet base 5b (S9), thereby the payment accounting for the transaction is completed.

Figure 5:
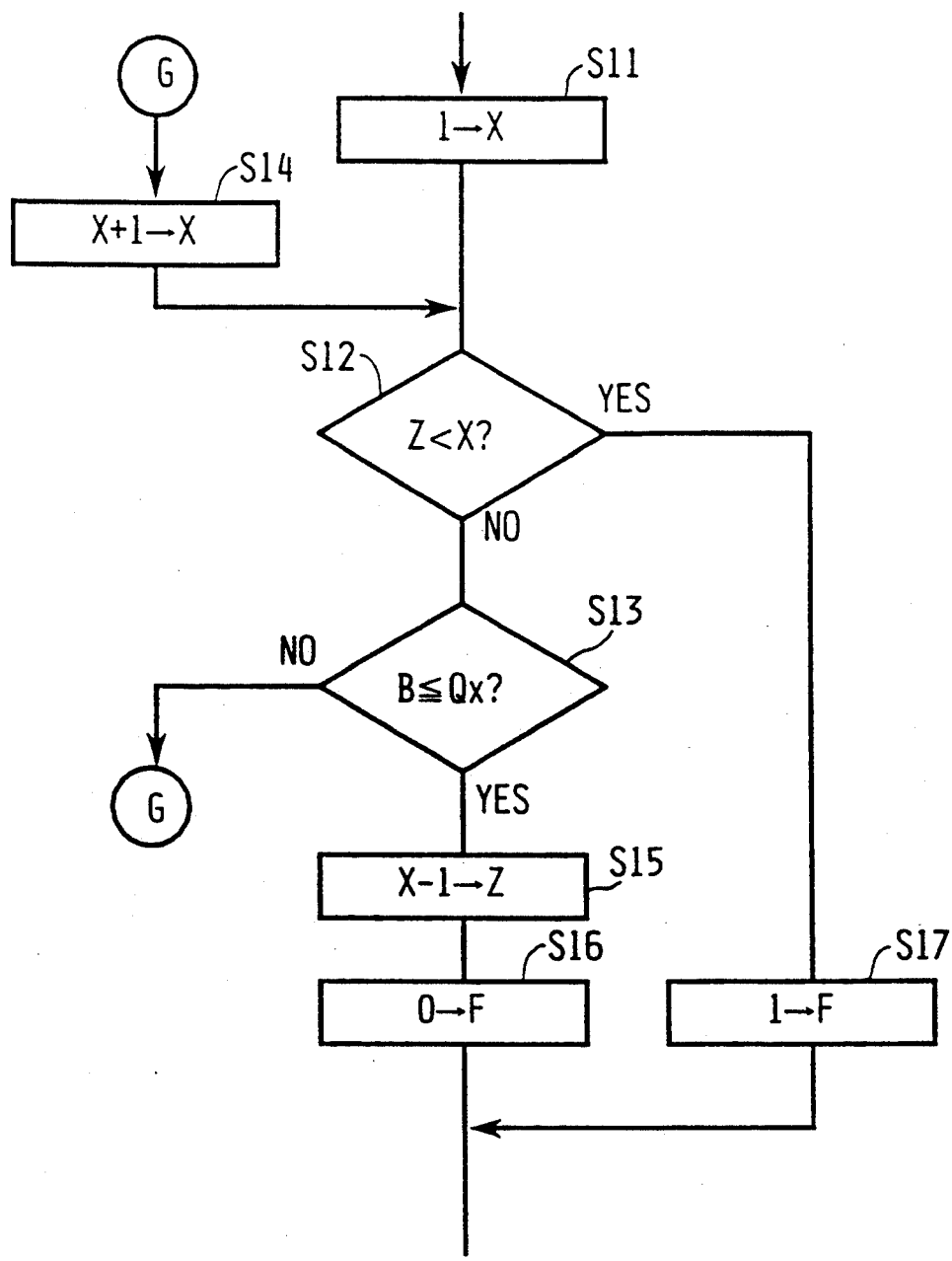
FIG. 5 is a flow chart illustrating a processing procedure of a decision subroutine.

In the decision sub-routine shown in FIG. 5, the control unit 8 performs a comparison of the new balance amount B with each of the decision data $Q_1$-$Q_z$ corresponding to the lowest address 1 to the decision upper limit address Z in sequence.

That is, the control unit 8 first performs the initial setting of X=1 as the decision data address X (S11).

Subsequently the decision upper limit address Z is compared with the decision data address X, and it is decided whether or not the decision data address X exceeds the decision upper limit address Z (S12). If the decision data address X exceeds the decision upper limit address Z (Z<X), the balance amount B does not satisfy the printing condition and the decision flag F is set at "1" and the processing by the sub-routine is finished and the program is returned to S6 of the main routine shown in FIG. 4.

On the other hand, in S12, if the decision data address X does not exceed the decision upper limit address Z (X≦Z), the program advances to S13. Considering the card C in the initial non-used state, since Z=15 and X=1 in this time point, processing of S13 is performed.

In S13, the control unit 8 compares the decision data $Q_x$ corresponding to the decision data address X in the decision region 11 with the balance amount B. If the balance amount B is the decision data $Q_x$ or less (B≦$Q_x$), the printing condition is satisfied. During the next accounting, the decision data is decremented to $Q_{x-1}$ (lower by one rank than the decision data $Q_x$ used for the last affirmative decision in S13), the decision upper limit address Z is again set lower by one rank than the address X of the decision data $Q_x$ (S15), and the decision flag F is set at "0". The processing by the sub-routine is thus finished and the program is returned to S6 of the main routine shown in FIG. 4.

On the other hand, in S13, if the balance amount B is more than the decision data $Q_x$ ($Q_x$<B), the decision data address X incremented by one rank (S14), and then the program is returned to S12 and the decisions of S12, S13 are repeated.

Thus in S12-S14, the control unit 8 uses the decision data $Q_z$ corresponding to the decision upper limit address Z as the upper limit value of decision and compares the balance amount with the decision data $Q_x$ in sequence from the smallest value, and when the balance amount B becomes any of the decision values or less, the printing condition is satisfied and the program is advanced to S15, S16. On the other hand, if the decision is performed up to the decision data $Q_z$ corresponding to the upper address Z and the condition of B≦$Q_z$ is not yet satisfied, the program is advanced from S12 to S17 and a decision is not performed regarding the decision data of the address of Z+1 or more. In the card C, when steps of S12-S14 are processed repeatedly, at x=15, it follows that $$B (=8500) \leq Q_{15} (=9000)$$

and since the condition of S13 is satisfied, at S15, the upper limit address Z is made
$Z=X-1=15-1=14$ and then the program is returned to S6. If the balance amount B exceeds 9000 yen, steps S12-S14 are repeated, and at X=16, the condition of S12 is satisfied and the program passes through S17 and is returned to S6.

In the card C, since the decision upper limit address Z is set at Z=14, during next accounting, unless the balance amount B becomes the decision data $Q_{14}$=8000 (yen) corresponding to Z=14 or less, the printing on the card C is not performed.

According to the embodiment as above described, since it is decided whether or not the balance amount B of the prepaid card C after the payment accounting satisfies the printing decision condition, and only when the condition is satisfied is the printing performed on the card C, printing on the card C is suitably controlled and every time the suitable amount is attained the use history can be printed on the printing surface of the card. Consequently, such a state can be prevented that although the balance amount still exists in the card, a space to be printed does not remain on the printing surface of the card C.

Next, a second embodiment will be described.

Figure 7:
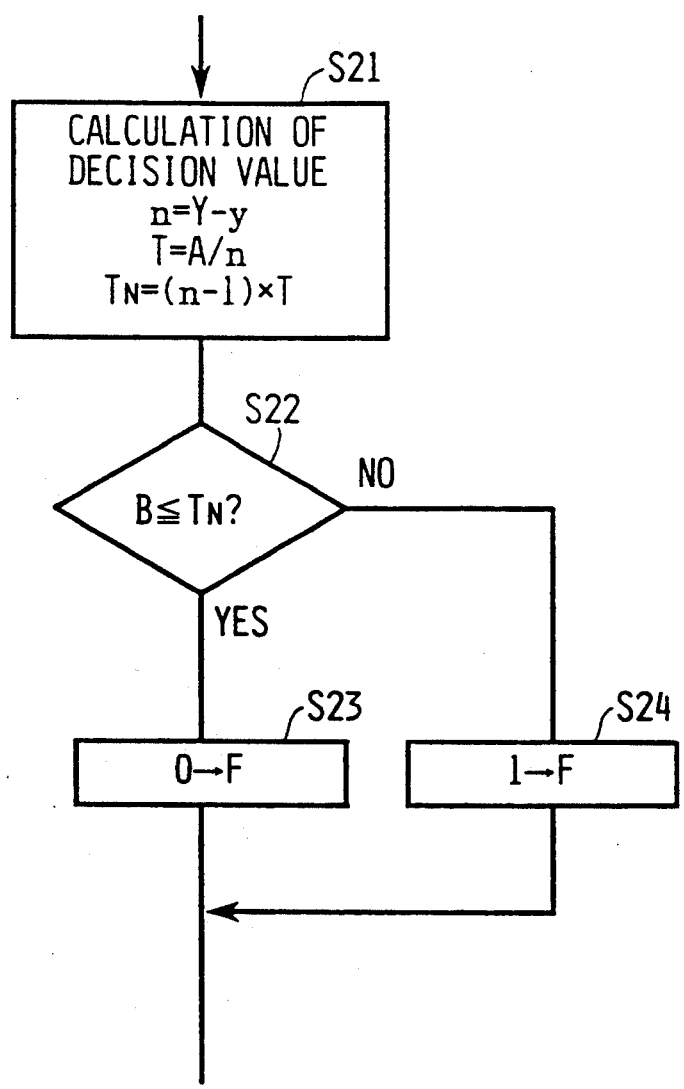
FIG. 7 is a flow chart of a second embodiment of the invention illustrating a processing procedure of a decision subroutine in place of FIG. 5.

In place of the decision method as in the decision subroutine (S5) of the first embodiment where the balance amount B after an accounting is compared with the preset decision data $Q_x$ in sequence, in the second embodiment, a ratio of the remaining line number capable of being printed on the card C and the balance amount B is considered, and the decision value as the basis of decision regarding whether the printing should be performed or not, may be varied every time in accordance with a definite formula. That is, a decision subroutine as shown in FIG. 7 may be used.

According to this subroutine, after the sheet is prepared (S4), the control unit 8 calculates the remaining line number (n) capable of being printed based on the maximum line number Y capable of being printed on the card C previously read and the already printed line number (y) (formula 1), and calculates the decision base unit T based on the remaining line number (n) and the balance amount A before the accounting (formula 2). The decision base unit T is multiplied by a number one less than the remaining line number (n) and the product is made the decision value $T_N$ (formula 3) (S21).

$$\text{remaining line number: } n = Y - y \quad (1)$$

$$\text{decision base unit: } T = A/n \quad (2)$$

$$\text{decision value: } T_N = (n-1) \times T \quad (3)$$

The decision base unit T means the definite amount of money which can use the remaining line number (n) completely when the remaining line number (n) of the card C is printed per a definite amount. The decision value $T_N$ means the maximum amount of money to be printed first when the remaining line number (n) of the card C is printed per a definite amount. If the card C treated in the first embodiment is applied, it follows that from Y=15, y=0, A=10000 n=15, T=666

(omit figure below the decimal point)

$T_N = 14 \times 666 = 9324$

The control unit 8 calculates the decision value $T_N$, and then compares the decision value $T_N$ with the balance amount B after the accounting (S22). If the balance amount B becomes the decision value $T_N$ or less ($B \leq T_N$), the printing condition is satisfied, and the decision flag F is set at "0" (S23). If the balance amount B exceeds the decision value $T_N$ ($T_N < B$), the printing condition is not satisfied, and the decision flag F is set at "1" (S24).

Since the printing to the prepaid card C is controlled in accordance with the decision procedure of FIG. 7, such a state can be prevented that although the balance amount A is much, the remaining line number (n) of the card is little. Also, when the balance amount A is little and the remaining line number (n) is much, since the balance amount can be printed relatively piece-meal to the card C, if the customer should like to know the balance amount as exactly as possible even when the balance amount of the card C is little, the customer's request can be granted as well.

The present invention is not limited to the described first and second embodiments, but may be executed as follows.

Before the prepaid card C is discharged from the control device 1, the balance amount may be stored as magnetic information on the card C.

The printing content of the card C may be the total payment amount during the accounting.

Series of the decision data $Q_x$ in the first embodiment may be stored in the card C, and the decision data having a value larger than that of the decision data $Q_M$ at the satisfying decision condition is eliminated every time of the decision and the upper limit of the decision data during next account is made $Q_{M-1}$.

As another embodiment, the recording head is not of wire dot type, but may be of the daisy wheel or ball-type.

Also as another embodiment, the recording portion is not the rear surface of the prepaid card, but may be the front surface of the prepaid card.

As many apparently widely different embodiments of this invention may be made without departing from the spirit and scope thereof, it is to be understood that the invention is not limited to the specific embodiments thereof except as defined in the appended claims.

What is claimed is:

1. A card processing device for processing a card having a recording portion on which balance amount information is recorded, the card processing device comprising:

input means for inputting a charge amount to be charged against an account for a transaction;

defrayal information preparing means for calculating a new balance amount of said account based on the charge amount inputted by said input means and a previous balance amount, and for providing defrayal information relating to the new balance amount;

recording means for recording the defrayal information on the recording portion of said card; and decision control means for controlling at a plurality of decision points whether or not the defrayal information is to be recorded on said card by said recording means for a given transaction on the basis of the new balance amount.

2. A card processing device for processing a card having a memory for storing information relating to an account balance and a recording portion on which balance information is recorded, the card processing device comprising:

reading means for reading the account balance stored in said memory;

input means for inputting a charge amount to be charged against said account balance for a transaction;

defrayal information preparing means for calculating a new balance amount of said account based on the charge amount inputted by said input means and the account balance read by said reading means, and for providing defrayal information relating to the new balance amount;

recording means for recording the defrayal information on the recording portion of said card; and decision control means for controlling at a plurality of decision points whether or not the defrayal information is to be recorded on said card by said recording means for a given transaction on the basis of the new balance amount.

3. A card processing device as set forth in claim 2, wherein said decision control means comprises a CPU, a ROM and a RAM, and the ROM is provided with programs for deciding whether or not the defrayal information for the transaction is to be recorded on said card.

4. A card processing device as set forth in claim 3, wherein one of the programs provided in said ROM is a decision sub-routine for deciding whether or not the defrayal information is to be recorded on the recording portion of said card by said recording means, said sub-routine including means for setting a decision flag indicating whether or not a definite condition has been satisfied for recording the defrayal information.

5. A card processing device as set forth in claim 4, wherein when the decision flag indicates that the definite condition has not been satisfied, said recording means does not record the defrayal information on said card and the card is discharged from said card processing device.

6. A card processing device as set forth in claim 4, wherein said decision control means calculates a plurality of decision values as a basis for the decision of whether recording of the defrayal information should be performed, in accordance with a definite formula based on a number of recording lines remaining available for recording on the card and the new balance amount.

7. A card processing device as set forth in claim 6, wherein after calculating the decision values, said decision control means compares each decision value with the new balance amount after the transaction, and if the balance amount is equal to or less than the decision value the decision flag is set to indicate that the definite condition for recording has been satisfied, and if the balance amount exceeds the decision value, the decision flag is set to indicate that the definite condition for recording has not been satisfied.

8. A card processing device as set forth in claim 6, wherein said decision control means calculates the remaining number of recording lines as the maximum number of recording lines of the card minus the number of already recorded lines and calculates a decision base unit as the balance amount before the transaction divided by the remaining number of recording lines, and further calculates the decision value as the decision base unit multiplied by a number one less than the number of remaining recording lines.

9. A card processing device as set forth in claim 2, further comprising a sheet printing device for printing the charge amount for the transaction on a sheet in said sheet printing device, wherein after said sheet printing device prints the charge amount on a sheet, said decision control means decides whether or not the defrayal information is to be recorded on the recording portion of the card by said recording means.

10. A card processing device as set forth in claim 2, wherein said decision control means uses decision data for deciding whether or not the defrayal information is to be recorded on the recording portion of said card for the transaction.

11. A card processing device as set forth in claim 10, wherein said decision control means includes means for using data indicating the maximum number of recording lines on the recording portion of said card, and data indicating a current number of recorded lines on the recording portion of said card.

12. A card processing device as set forth in claim 10, said device further comprising a storage device for storing said decision data, said decision data comprising a plurality of reference balance values stored in sequence from a smallest value to a largest value in said storage device.

13. A card processing device as set forth in claim 12, wherein said decision control means compares the new balance amount with said reference balance values sequentially from the smallest value until (a) said balance amount is found to be equal to or less than one of said reference values, whereupon recording is performed, or (b) said balance amount is compared with a reference balance amount corresponding to an upper limit address, which corresponds to the largest value in the sequence of reference values to be sequentially compared by the decision control.

14. A card processing device as set forth in claim 13, wherein said upper limit address is determined based upon a remaining number of lines available to be recorded on the card.

15. A card processing device as set forth in claim 10, wherein the reading means includes means for reading said decision data from the memory of said card.

16. A card processing device as set forth in claim 2, wherein said defrayal information is monetary information.

17. A card processing device as set forth in claim 2, wherein said decision control means calculates a plurality of decision values as a basis for the decision of whether recording of the defrayal information should be performed, in accordance with a definite formula based on a number of recording lines remaining available for recording on the card and the new balance amount.

18. A card processing device as set forth in claim 2, further comprising conveying means for conveying said card with respect to said recording means and wherein said decision control means calculates a recording timing for the recording portion of said card based on the maximum number of recording lines on the recording portion and the number of already recorded lines on the recording portion while said card is conveyed by said conveying means.

19. A card processing device as set forth in claim 2, wherein the recording portion has a number of lines for recording the defrayal information, one line being used each time the defrayal information is recorded on the card; and said decision control means calculates a decision value as a basis for the decision of whether recording of the defrayal information should be performed, in accordance with a formula based on the new balance amount and the number of recording lines remaining for recording on the card.

20. A card processing device as set forth in claim 2, wherein the memory of said card stores a registration number, and the card processing device includes a storage device for storing information relating to the registration number and the balance amount of said account corresponding to the registration number.

21. A card processing device as set forth in claim 20, wherein said defrayal information preparing means adds individual charges of the transaction and calculates the charge amount, and subtracts the charge amount from the balance amount stored in said storage device to calculate a new balance amount after the transaction.

22. A card processing device for printing on the card, wherein identification information on the card is read, an account is thereby discriminated, and a balance amount determination is performed on said account, said device comprising:
- information reading means for reading the identification and balance amount information on the card;
- input means for inputting a charge amount for a transaction;
- information storage means for storing defrayal information relating to the balance amount and the charge amount;
- printing means for printing defrayal information on the card; and
- decision control means for calculating the balance amount based on the charge amount inputted by said input means and the balance amount information read by the information reading means, and for printing defrayal information on the card via said printing means when the balance amount attains a decision amount which is previously set or calculated based on the defrayal information.

23. A card processing device for processing a card having a memory for storing information relating to an account balance and a recording portion on which information is recorded, the card processing device comprising:
- reading means for reading the account balance stored in said memory;
- input means for inputting a charge amount to be charged against an account for a transaction;
- defrayal information preparing means for calculating a new balance amount of said account based on the charge amount inputted by said input means and the account balance read by the reading means, and for providing defrayal information relating to a new account balance;
- recording means for recording the defrayal information on the recording portion of said card; and
- decision control means for controlling at a plurality of decision points whether or not the defrayal information is to be recorded on said card by said recording means for a given transaction, said decision control means comprising a means for storing a program for determining if the defrayal information for the given transaction is to be recorded on the card, and wherein said program calculates a decision value as a basis for the decision of whether recording of the defrayal information should be performed in accordance with a formula based on a number of recording lines remaining available for recording on the card and the new balance amount.

* * * * *